United States Patent [19]

Mori et al.

[11] Patent Number: 4,598,541
[45] Date of Patent: Jul. 8, 1986

[54] HOT GAS GENERATOR

[75] Inventors: Hiromitsu Mori, Osaka; Kosuke Akagi, Ikomashi; Hiroki Kitahata, Hirakatashi, all of Japan

[73] Assignee: Osaka Gas Company Limited, Osaka, Japan

[21] Appl. No.: 727,293

[22] Filed: Apr. 25, 1985

[30] Foreign Application Priority Data

May 8, 1984 [JP] Japan .................................. 59-91241
May 9, 1984 [JP] Japan .................................. 59-93138

[51] Int. Cl.$^4$ ............................................... F02C 7/26
[52] U.S. Cl. ................................. 60/39.07; 60/39.08; 60/39.141
[58] Field of Search ................ 60/39.07, 39.08, 39.13, 60/39.141, 39.142, 39.465, 261

[56] References Cited

U.S. PATENT DOCUMENTS

| | | | |
|---|---|---|---|
| 2,822,665 | 2/1958 | Nicolin | 60/39.142 |
| 2,866,385 | 12/1958 | Miller | 60/39.141 |
| 2,941,790 | 6/1960 | Compton et al. | 60/39.142 |
| 3,310,937 | 3/1967 | Smith | 60/39.141 |
| 3,691,759 | 9/1972 | Scheerer | 60/39.141 |
| 4,058,973 | 11/1977 | Ferm et al. | 60/39.142 |

Primary Examiner—Louis J. Casaregola
Attorney, Agent, or Firm—Webb, Burden, Robinson & Webb

[57] ABSTRACT

There is disclosed a hot gas generator comprising a compressor for supplying compressed air to a combustion chamber, a gas turbine driven by hot gas flowing from the combustion chamber and operatively connected to the compressor by means of a common rotary shaft, a blower for starting the compressor, an air pressure sensor for detecting an inlet pressure of air supplied to the compressor, a flame monitoring sensor for confirming ignition, a valve for controlling fuel gas supply to the combustion chamber, and a control mechanism. The control mechanism is operable to open the valve to a certain extent and actuate an ignition device at the same time upon a predetermined time lapse after blower actuation, to stop the ignition device and open the valve at a predetermined speed at the same time in response to an ignition confirmation signal from the flame monitoring sensor, and to stop the blower in response to a signal from the air pressure sensor indicating that the generator is in self-sustaining operation.

17 Claims, 1 Drawing Figure

HOT GAS GENERATOR

FIELD OF THE INVENTION

This invention relates to a hot gas generator, and more particularly to a self-sustaining type hot gas generator wherein a compressor for supplying compressed air to a combustion chamber is operatively connected to a turbine driven by hot gas sent from the combustion chamber.

BACKGROUND OF THE INVENTION

The hot gas generator of the above-noted type according to the prior art comprises an oil pump for lubricating a bearing portion supporting a common rotary shaft extending between the compressor and the turbine, and starter means such as a motor, blower or the like for starting the compressor. At a starting time, the oil pump is first actuated to lubricate the bearing portion and then the starter means is actuated to supply air and fuel gas to the combustion chamber where a mixture of the air and fuel gas is ignited. At a stopping time, the fuel gas supply is discontinued and an oil cooler for preventing fusing of the bearing portion is stopped after a certain time lapse.

However, the above series of operational steps are taken manually, and it is therefore necessary for the operator to ensure each of the steps including supplying of lubricating oil, ignition, and self-sustaining operation of the generator by reading varied meters and the like. Misoperations by the operator could lead to serious consequences. For example, the bearing portion will be damaged when the generator is started with insufficient lubricating oil supply. In particular, a mistiming of the supply of fuel gas and air and the ignition may result in generation of incomplete combustion gases or even a danger of explosion.

SUMMARY OF THE INVENTION

The object of this invention is to provide a hot gas generator equipped with control means to sequence-control the operational steps automatically.

According to one aspect of the invention, a hot gas generator comprises a blower for starting a compressor, air pressure sensor means for detecting air inlet pressures of the compressor, flame monitoring sensor means for confirming ignition, gas flow control valve means mounted in fuel gas supply means connected to a combustion chamber, and the control means. The control means is operable to open the gas flow control valve means to a certain extent and actuate ignition means at the same time upon a predetermined time lapse after actuation of the blower, to put the ignition means out of action and open the gas flow control valve means to a predetermined extent at the same time upon receipt of an ignition confirming signal from the flame monitoring sensor means, and to stop the blower in response to a signal from the air pressure sensor means indicating that the generator is in self-sustaining operation. In the above construction, fuel gas supply and ignition take place simultaneously when the air supply to the combustion chamber becomes regular and constant upon the predetermined time lapse after the actuation of the blower. Upon detection of the ignition the fuel gas supply is gradually increased. When the generator comes into the self-sustaining operation and the inlet pressure of the compressor decreases, the blower for starting the compressor is put out of action. Therefore, the ignition is automatically well timed with the fuel gas and air supplies, which eliminates the possibilities of incomplete combustion gas generation or explosion. Furthermore, this construction is capable of avoiding wasteful power consumption by stopping the blower immediately upon the self-sustaining operation of the generator.

According to a further aspect of the invention, the hot gas generator includes means to supply lubricating oil to a bearing portion supporting a common rotary shaft extending between the compressor and the turbine, and oil pressure sensor means to detect oil supply pressures. In this construction to control means effects the sequence control after actuating the blower in response to an oil supply confirmation signal from the oil pressure sensor means. This eliminates the problem of possible damage to the bearing portion.

The above and other objects and features of the present invention will become apparent from the following description taken in conjunction with a preferred embodiment thereof with reference to the accompanying drawing.

DETAILED DESCRIPTION OF THE PREFERRED EMBODIMENT

Figure 1:
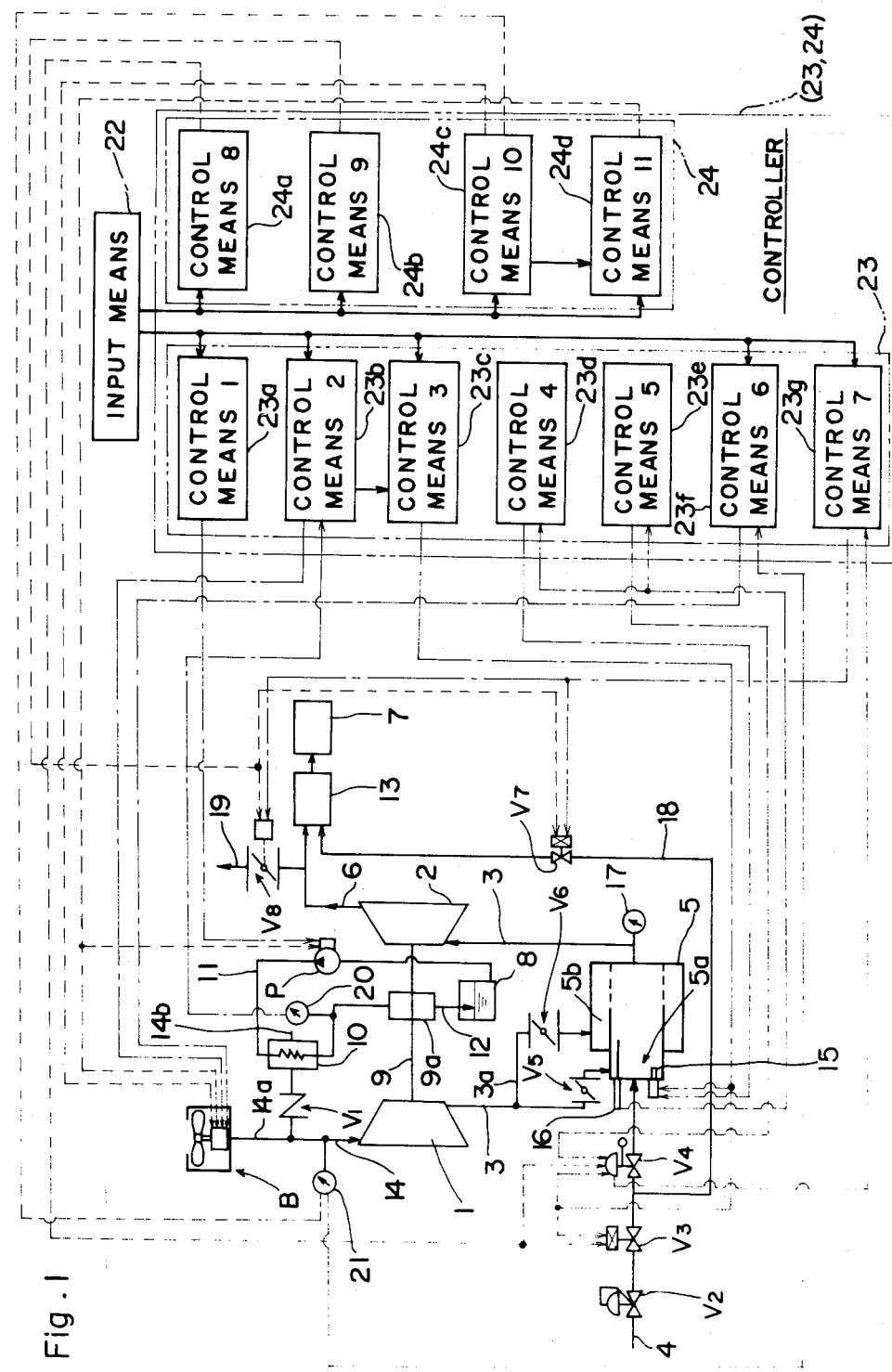
FIG. 1 is a schematic view of a hot gas generator embodying this invention.

Referring to FIG. 1, a hot gas generator of the invention comprises a compressor 1 for supplying compressed air operatively connected to a gas turbine 2 by means of a common rotary shaft 9. The compressor 1 has an air conduit 14 to which a starter air conduit 14a including a blower B and an air conduit 14b including a check valve V1 for supplying air during a self-sustaining operation of the generator are connected in parallel to each other. Thus, the compressor 1 and the gas turbine 2 are started by starter air supplied under pressure by the blower B, and the compressor 1 in rotation draws the air from the check valve V1. The air conduit 14 has a pressure sensor 21 to detect inlet pressures of the compressor 1.

The compressor 1 is connected to a combustion chamber 5 through a conduit 3 and a branch conduit 3a. The conduit 3 is connected to a burner portion 5a of the combustion chamber 5 and includes a flow control valve V5. The branch conduit 3a is connected to an air jacket portion 5b of the combustion chamber 5 and includes a flow control valve V6. The two flow control valves V5 and V6 are operable to adjust ratios of air supplies to the burner portion 5a and the jacket portion 5b whereby temperature controls are effected to realize stable combustion in the combustion chamber 5. To the burner portion 5a of the combustion chamber 5 a fuel gas supply conduit 4 is connected which includes a gas pressure regulator valve V2, a gas cutoff valve V3 and a gas flow control valve V4. The combustion chamber 5 includes an ignition plug 15 and a flame monitoring sensor 16.

A hot gas discharge conduit 6 extends from an outlet of the combustion chamber 5, and the gas turbine 2 is mounted in this discharge conduit 6. The discharge conduit 6 includes an afterburner 13 downstream of the gas turbine 2 to further heat the hot gas flowing in from the gas turbine 2 and supply the hot gas to an external apparatus 7 such as a metal heating furnace or the like.

A conduit 18 including a gas flow control valve V7 extends from a position of the fuel gas supply conduit 4 downstream of the gas cutoff valve V3 to the afterburner 13 to supply fuel gas to the latter, whereby the afterburner 13 is adapted to further heat the hot gas in a controlled manner.

A gas release conduit 19 including a butterfly valve V8 is connected to a position of the hot gas discharge conduit 16 between the gas turbine 2 and the afterburner 13. At a starting time of the generator the butterfly valve V8 is opened to lighten a load of the gas turbine 2 in order to expedite transition to the self-sustaining operation of the generator. The butterfly valve V8 is closed when the generator comes into the self-sustaining operation.

Reference numeral 17 in the drawing denotes a thermometer for detecting and indicating temperatures of the hot gas leaving the combustion chamber 5. On the basis of the temperatures detected by the thermometer 17 the gas flow control valve V4 is automatically operable to adjust the temperatures of the hot gas leaving the combustion chamber 5.

The common rotary shaft 9 extending between the compressor 1 and the turbine 2 is supported by a bearing portion 9a which is supplied with lubricating oil by oil supply means. This oil supply means comprises an oil pump P for sending the lubricating oil from a tank 8 to the bearing portion 9a, an oil supply conduit 11, an oil return conduit 12 extending from the bearing portion 9a to the tank 8, an oil cooler 10 disposed between the oil pump P and the bearing portion 9a for cooling the lubricating oil by means of the air flowing through the air conduit 14b, and an oil pressure sensor 20 for detecting pressures of oil supplied by the oil pump P.

The hot gas generator according to this invention further comprises control mechanism 23 and 24 for automatically controlling the oil pump P, the blower B, the ignition plug 15, and the valves V3, V4, V7 and V8 in response to signals provided by the flame monitoring sensor 16, the oil pressure sensor 20 and the air pressure sensor 21 and to start and stop commands provided by an input device 22. The control mechanisms 23 and 24 comprise a start control mechanism 23 and a stop control mechanism 24 including varied devices, respectively, as follows:

The start control mechanism 23 includes;
(a) a first control device 23a for actuating the oil pump P in response to a start command provided by the input device 22,
(b) a second control device 23b for actuating the blower B in response to the start command provided by the input device 22 and the signal provided by the oil pressure sensor 20,
(c) a third control device 23c for actuating the ignition plug 15 and opening the valves V3 and V4 in response to the start command of the input device 22 and a signal from the second control device 23b indicating actuation of the blower B, and upon a predetermined time lapse after the blower actuation,
(d) a fourth control device 23d for putting the ignition plug 15 out of action in response to the signal from the flame monitoring sensor 16 confirming ignition,
(e) a fifth control device 23e for opening the valve V4 at a predetermined opening speed to increase fuel gas flow in response to the ignition confirming signal received from the flame monitoring sensor 16,
(f) a sixth control device 23f for stopping the blower B in response to the start command from the input device 22 and a first signal from the air pressure sensor 21, and
(g) a seventh control device 23g for opening the valve V7, closing the valve V8 and igniting the afterburner 13 in response to the start command from the input device 22 and a signal from the fifth control device 23e indicating that the flow control valve V4 is opened to a predetermined extent to provide a rated flow.

The stop control mechanism 24 includes;
(h) an eighth control device 24a for closing the the valves V3 and V4 in response to a stop command provided by the input device 22,
(i) a ninth control device 24b for closing the valve V7 and opening the valve V8 in response to the stop command from the input device 22,
(j) a tenth control device 24c for actuating the blower B in response to the stop command from the input device 22 and a second signal from the air pressure sensor 21, and
(k) an eleventh control device 24d for stopping the blower B and the oil pump P in response to the stop command from the input device 22 and a signal from the tenth control device 24c indicating the actuation of the blower B, and upon a predetermined time lapse after the blower actuation.

For starting the generator, the input device 22 provides the start command whereupon the oil pump P is actuated to supply the lubricating oil to the bearing portion 9a. When the oil supply pressure reaches a predetermined value, the oil pressure sensor 20 generates a signal. In response to this signal the second control device 23b actuates the blower B to send air through the compressor 1 to the combustion chamber 5. Upon the predetermined time lapse after the actuation of the blower B which permits the combustion chamber 5 to be purged, the third control device 23c actuates the ignition plug 15 and opens the valves V3 and V4 to a certain extent at the same time thereby to ignite the air/fuel gas mixture. Then, in response to the ignition confirming signal from the flame monitoring sensor 16 the fourth control device 23d puts the ignition plug 15 out of action and the fifth control device 23e opens the valve V4 at the predetermined speed. When the hot gas generator comes into the self-sustaining operation, the inlet pressure of the compressor 1 becomes a negative gauge pressure whereby the air pressure sensor 21 generates the first signal. In response to the first signal the sixth control device 23f stops the blower B. When the valve V4 reaches the predetermined opening degree, the seventh control device 23g opens the valve V7, closes the valve V8 and ignites the afterburner 13 in response to the signal from the fifth control device 23e. Thus, the external apparatus 7 is advantageously supplied with hot gas in a constant manner.

For stopping the generator, the input device 22 provides the stop command whereupon the eighth control device 24a closes the valves V3 and V4 to stop the combustion. The ninth control device 24b closes the valve V7, extinguishes the afterburner 13, and opens the valve V8 to discharge the hot gas outwardly of the generator through the gas release conduit 19. The air pressure sensor 21 generates the second signal when the inlet pressure of the compressor 1 returns to a positive gauge pressure. In response to the second signal the tenth control device 24c actuates the blower B to cool the gas turbine 2 and the bearing portion 9b. Upon the predetermined time lapse after the actuation of the blower B the eleventh control 24d puts the blower B and the oil pump P out of action.

There is a permissible temperature limit to the gas turbine 2 depending on a material or the like of the turbine. This invention provides a safety mechanism in order to protect the turbine 2 against a rapid increase in the temperature of the hot gas flowing into the turbine 2. This safety mechanism includes a temperature sensor for detecting the temperature of the hot gas flowing from the combustion chamber 5 to the turbine 2. When the temperature sensor detects the temperature limit, a stop command is transmitted to the control mechanism 24. The thermometer 17 in the described embodiment may act also as the temperature sensor.

While in the described embodiment ordinary air is supplied to the compressor 1, it is of course possible to employ another type of combustion assisting gas, as desired, such as air having a different oxygen content or a different composition. The combustion chamber 5 may be the catalytic combustion type with a fuel gas supply conduit connected upstream of the compressor 1 or with the fuel gas supply conduit 4 adapted to supply liquid fuel to the combustion chamber 5. In the latter instance, flow rate of the fuel may be controlled by means of the valves V3 and V4.

The invention may be practised without the afterburner 13, the fuel gas supply conduit 18 therefor, the gas release conduit 19 and the control mechanisms for these elements, or without the oil cooler 10 and the branch conduit 3a. In other words, these and other specific components are replaceable or dispensable as desired.

The control mechanisms 23 and 24 may employ the sequence controls or microcomputer controls. For example, the input device 22 may provide the start command for the appropriate control devices in response to an increase of the oil supply pressure to the predetermined value detected by the oil pressure sensor 20 or the stop command for the appropriate devices in response to an increase of the air pressure from a negative gauge pressure up to ambient pressure detected by the air pressure sensor 21.

The specific construction of the input means 22 also has a wide range of choice. For example, the input means 22 may include a switch for selecting between automatic ignition control and manual ignition control, and an ignition control member, so that the starting operation and the ignition may be effected manually as well as automatically.

What is claimed is:

1. A hot gas generator comprising;
   a combustion chamber (5) including a burner portion (5a) ignited by ignition means (15),
   a compressor (1) for supplying compressed air to the combustion chamber (5) through compressed air conduit means,
   air supply means for introducing air into the compressor (1) and including a first and a second air conduits (14a, 14b) connected to the compressor (1) in parallel to each other, the first air conduit (14a) having a blower (B), and the second air conduit (14b) having a check valve (V1) to stop the air flowing in from the first air conduit (14a),
   a hot gas discharge conduit (6) connected to the combustion chamber (5) to discharge hot gas generated in the combustion chamber (5),
   a turbine (2) mounted in the hot gas discharge conduit (6) and operatively connected to the compressor (1) by a common rotary shaft supported by bearing means,
   fuel gas supply means for supplying fuel gas to the burner portion (5a), the fuel gas supply means including a fuel gas supply conduit (4) connected to the burner portion (5a) and gas flow control valve means (V4) mounted in the fuel gas supply conduit (4),
   input means (22) operable by an operator to provide a start command and a stop command,
   air pressure sensor means (21) for detecting inlet pressures of the air supplied to the compressor (1), the air pressure sensor means (21) providing a first signal when the inlet pressures are below a predetermined pressure, and a second signal when the inlet pressures are above the predetermined pressure,
   flame monitoring sensor means (16) for confirming ignition of the burner portion (5a) and providing a third signal, and
   control means (23, 24) operable in response to the start command from the input means (22)
   to actuate the ignition means (15) and open the gas flow control valve means (V4) to a certain extent at the same time,
   to put the ignition means (15) out of action and open the gas flow control valve means (V4) to a predetermined extent at a predetermined opening speed at the same time upon receipt of the third signal from the flame monitoring sensor means (16), and
   to stop the blower (B) upon receipt of the first signal from the air pressure sensor means (21),
   and operable in response to the stop command from the input means (22)
   to close the gas flow control valve means (V4) and
   to actuate the blower (B) upon receipt of the second signal from the air pressure sensor means (21).

2. A hot gas generator as claimed in claim 1 further comprising;
   oil supply means for supplying lubricating oil to the bearing means (9a) rotatably supporting the common rotary shaft, and
   oil pressure sensor means (20) for detecting supply pressures of the lubricating oil supplied from the oil supply means and providing a fourth signal when the supply pressures exceed a predetermined pressure,
   the control means (23, 24) including delay means operable in response to the start command to actuate the blower (B) upon receipt of the fourth signal and after a predetermined time lapse actuate the ignition means (15).

3. A hot gas generator as claimed in claim 2 wherein the control means includes further delay means operable in response to the stop command to put the blower (B) and the oil supply means out of action upon a predetermined time lapse after receipt of the second signal from the air pressure sensor means (21).

4. A hot gas generator as claimed in claim 3 wherein the oil supply means includes an oil cooler (10) for cooling the lubricating oil by means of air flowing in the second air conduit (14b).

5. A hot gas generator as claimed in claim 3 wherein the fuel gas supply conduit (4) includes a gas cutoff valve means (V3) upstream of the gas flow control valve means (V4), the control means being operable to open the gas flow control valve means (V4) and the cutoff valve means (V3) in response to the start command and to close the gas flow control valve means (V4) and the cutoff valve means (V3) in response to the stop command.

6. A hot gas generator as claimed in claim 5 further comprising afterburner means mounted in the hot gas discharge conduit (6) downstream of the turbine (2) for further heating the hot gas flowing from the turbine (2) prior to discharge thereof, and a gas release conduit having a control valve (V8) and connected to the gas discharge conduit (6) between the turbine (2) and the afterburner means.

7. A hot gas generator as claimed in claim 6 wherein the afterburner means is connected through a gas conduit (18) including a flow control valve (V7) to the fuel gas supply conduit (4) at a position upstream of the gas flow control valve means (V4).

8. A hot gas generator as claimed in claim 7 wherein the control means further includes means to open the flow control valve (V7) and the control valve (V8) and to ignite the afterburner means after the gas flow control valve means (V4) opens to the predetermined extent at the predetermined speed.

9. A hot gas generator as claimed in claim 8 wherein the compressed air conduit means leading from the compressor (1) includes a third conduit (3) connected to the burner portion (5a) of the combustion chamber (5) and a branch conduit (3a) connected to an air jacket portion (5b) of the combustion chamber (5), the third conduit (3) and the branch conduit (3a) having control valves (V5, V6), respectively, to effect temperature control in order to achieve stable combustion in the combustion chamber (5).

10. A hot gas generator as claimed in claim 9 further comprising temperature sensor means disposed upstream of the turbine (2) to send a stop command to the control means when a temperature of the gas flowing into the turbine (2) exceeds a predetermined temperature.

11. A hot gas generator comprising;
a combustion chamber (5) including a burner portion (5a) ignited by ignition means (15),
a compressor (1) for supplying compressed air to the combustion chamber (5) through a compressed air conduit,
air supply means for introducing air into the compressor (1) and including a first and a second air conduits (14a, 14b) connected to the compressor (1) in parallel to each other, the first air conduit (14a) having a blower (B), and the second air conduit (14b) having a check valve (V1) to stop the air flowing in from the first air conduit (14a),
a hot gas discharge conduit (6) connected to the combustion chamber (5) to discharge hot gas generated in the combustion chamber (5),
a turbine (2) mounted in the hot gas discharge conduit (6) and operatively connected to the compressor (1) by a common rotary shaft,
fuel gas supply means for supplying fuel gas to the burner portion (5a), the fuel gas supply means including a fuel gas supply conduit (4) connected to the burner portion (5a) and gas flow control valve means (V4) mounted in the fuel gas supply conduit (4),
air pressure sensor means (21) for detecting inlet pressures of the air supplied to the compressor (1) and providing a first signal when the inlet pressures are below a predetermined pressure,
flame monitoring sensor means (16) for confirming ignition of the burner portion (5a) and providing a detection signal, and
control means operable to actuate the ignition means and open the gas flow control valve means (V4) to a certain extent at the same time upon a predetermined time lapse after actuation of the blower (B), to put the ignition means (15) out of action and open the gas flow control valve means (V4) to a predetermined extent at a predetermined opening speed at the same time upon receipt of the detection signal from the flame monitoring sensor means (16), and to stop the blower (B) upon receipt of the first signal from the air pressure sensor means (21).

12. A hot gas generator as claimed in claim 11 further comprising;
oil supply means for supplying lubricating oil to bearing means (9a) rotatably supporting the common rotary shaft, and
oil pressure sensor means (20) for detecting supply pressures of the lubricating oil supplied from the oil supply means and providing a detection signal when the supply pressures exceed a predetermined pressure,
the control means including delay means operable to actuate the blower (B) upon receipt of the detection signal from the oil pressure sensor means (20) and after a predetermined time lapse actuate the ignition means (15).

13. A hot gas generator as claimed in claim 12 wherein the oil supply means includes an oil cooler (10) for cooling the lubricating oil by means of air flowing in the second air conduit (14b).

14. A hot gas generator as claimed in claim 13 wherein the fuel gas supply conduit (4) includes a gas cutoff valve means (V3) upstream of the gas flow control valve means (V4), the gas cutoff valve means (V3) being opened by the delay means simultaneously with the gas flow control valve means (V4).

15. A hot gas generator as claimed in claim 14 further comprising afterburner means mounted in the hot gas discharge conduit (6) downstream of the turbine (2) for further heating the hot gas flowing from the turbine (2) prior to discharge thereof, and a gas release conduit having a control valve (V8) and connected to the gas discharge conduit (6) between the turbine (2) and the afterburner means.

16. A hot gas generator as claimed in claim 15 wherein the afterburner means is connected through a gas conduit (18) including a flow control valve (V7) to the fuel gas supply conduit (4) at a position upstream of the gas flow control valve means (V4).

17. A hot gas generator as claimed in claim 16 wherein the control means further includes means to open the flow control valve (V7) and the control valve (V8) and to ignite the afterburner means after the gas flow control valve means (V4) opens to the predetermined extent at the predetermined speed.

* * * * *